US008326504B2

(12) United States Patent
Wu et al.

(10) Patent No.: US 8,326,504 B2
(45) Date of Patent: Dec. 4, 2012

(54) HOLISTIC CONTROL FOR STABILIZING VEHICLE-TRAILER SWAYING

(75) Inventors: Hsien-cheng Wu, Novi, MI (US); Jin-jae Chen, Canton, MI (US); Nathan Drummond, Howell, MI (US)

(73) Assignee: Robert Bosch GmbH, Stuttgart (DE)

( * ) Notice: Subject to any disclaimer, the term of this patent is extended or adjusted under 35 U.S.C. 154(b) by 685 days.

(21) Appl. No.: 12/512,783

(22) Filed: Jul. 30, 2009

(65) Prior Publication Data

US 2011/0029210 A1  Feb. 3, 2011

(51) Int. Cl.
  *B60T 7/12*  (2006.01)
(52) U.S. Cl. ............... 701/69; 701/36; 701/45; 701/48; 701/70; 701/71; 701/78; 701/81; 701/83; 280/400; 303/139; 303/140; 303/144; 303/146; 303/155; 303/157; 303/158; 303/168; 303/189; 180/14.1
(58) Field of Classification Search .................. None
See application file for complete search history.

(56) References Cited

U.S. PATENT DOCUMENTS

| 3,908,782 A | 9/1975 | Lang et al. |
| 4,023,863 A | 5/1977 | Sisson et al. |
| 4,023,864 A | 5/1977 | Lang et al. |
| 4,034,822 A | 7/1977 | Stedman |
| 4,232,910 A | 11/1980 | Snyder |
| RE30,550 E * | 3/1981 | Reise ............... 188/112 A |
| 4,254,998 A * | 3/1981 | Marshall et al. ......... 303/20 |
| 4,275,898 A | 6/1981 | Muste Llambrich |
| 4,697,817 A | 10/1987 | Jefferson |
| 4,706,984 A | 11/1987 | Esler et al. |
| 4,850,249 A | 7/1989 | Kristein |
| 5,011,170 A | 4/1991 | Forbes et al. |
| 5,022,714 A | 6/1991 | Breen |
| 5,029,948 A | 7/1991 | Breen et al. |
| 5,139,374 A | 8/1992 | Holt et al. |
| 5,333,940 A | 8/1994 | Topfer |
| 5,348,331 A | 9/1994 | Hawkins |
| 5,380,072 A | 1/1995 | Breen |

(Continued)

FOREIGN PATENT DOCUMENTS

CN  1661392  8/2005

(Continued)

OTHER PUBLICATIONS

Kimbrough, Scott, et al., "A Control Strategy for Stabilizing Trailers Via Selective Actuation of Brakes", Dynamic Systems of Control Division (Publication) DSC, vol. 44, Transportation Systems, 1992, pp. 413-428, ASME 1992.

(Continued)

*Primary Examiner* — Jonathan M Dager
(74) *Attorney, Agent, or Firm* — Michael Best & Friedrich LLP

(57) ABSTRACT

A trailer sway intervention system. The trailer sway intervention system includes a trailer having a plurality of wheels, each wheel having a brake, and a vehicle towing the trailer. The vehicle includes a plurality of sensors configured to sense operating characteristics of the vehicle, and a controller. The controller receives the sensed operating characteristics from the sensors, determines an error based on a difference between an expected yaw rate and a sensed yaw rate, asymmetrically applies braking forces to one or more trailer wheels based on the difference, and symmetrically applies braking forces to the trailer wheels when the absolute value of the difference between the expected yaw rate and the sensed yaw rate is declining.

13 Claims, 9 Drawing Sheets

U.S. PATENT DOCUMENTS

| | | | |
|---|---|---|---|
| 5,671,982 A * | 9/1997 | Wanke | 303/146 |
| 5,707,071 A | 1/1998 | Prestidge et al. | |
| 5,747,683 A * | 5/1998 | Gerum et al. | 73/117.01 |
| 5,799,745 A * | 9/1998 | Fukatani | 180/410 |
| 5,861,802 A | 1/1999 | Hungerink et al. | |
| 5,964,819 A | 10/1999 | Naito | |
| 5,986,544 A * | 11/1999 | Kaisers et al. | 340/431 |
| 6,012,780 A * | 1/2000 | Duvernay | 303/7 |
| 6,042,196 A * | 3/2000 | Nakamura et al. | 303/7 |
| 6,074,020 A * | 6/2000 | Takahashi et al. | 303/146 |
| 6,223,114 B1 | 4/2001 | Boros et al. | |
| 6,272,407 B1 | 8/2001 | Scholl | |
| 6,311,111 B1 | 10/2001 | Leimbach et al. | |
| 6,324,447 B1 | 11/2001 | Schramm et al. | |
| 6,349,247 B1 | 2/2002 | Schramm et al. | |
| 6,438,464 B1 | 8/2002 | Woywod et al. | |
| 6,446,998 B1 | 9/2002 | Koenig et al. | |
| 6,450,019 B1 * | 9/2002 | Wetzel et al. | 73/129 |
| 6,452,485 B1 | 9/2002 | Schutt et al. | |
| 6,466,028 B1 | 10/2002 | Coppinger et al. | |
| 6,476,730 B2 | 11/2002 | Kakinami et al. | |
| 6,480,104 B1 | 11/2002 | Wall et al. | |
| 6,494,281 B1 | 12/2002 | Faye et al. | |
| 6,498,977 B2 * | 12/2002 | Wetzel et al. | 701/70 |
| 6,501,376 B2 | 12/2002 | Dieckmann et al. | |
| 6,516,260 B2 * | 2/2003 | Wetzel et al. | 701/50 |
| 6,516,925 B1 | 2/2003 | Napier et al. | |
| 6,522,956 B2 * | 2/2003 | Hecker et al. | 701/1 |
| 6,523,911 B1 * | 2/2003 | Rupp et al. | 303/7 |
| 6,553,284 B2 | 4/2003 | Holst et al. | |
| 6,600,974 B1 | 7/2003 | Traechtler | |
| 6,604,035 B1 | 8/2003 | Wetzel et al. | |
| 6,636,047 B2 | 10/2003 | Arit et al. | |
| 6,655,710 B2 | 12/2003 | Lindell et al. | |
| 6,668,225 B2 * | 12/2003 | Oh et al. | 701/70 |
| 6,756,890 B1 | 6/2004 | Schramm et al. | |
| 6,788,190 B2 | 9/2004 | Bishop | |
| 6,873,891 B2 | 3/2005 | Moser et al. | |
| 6,959,970 B2 * | 11/2005 | Tseng | 303/146 |
| 7,114,786 B2 | 10/2006 | Bess et al. | |
| 7,125,086 B2 | 10/2006 | Tanaka et al. | |
| 7,204,564 B2 | 4/2007 | Brown et al. | |
| 7,226,134 B2 * | 6/2007 | Horn et al. | 303/7 |
| 7,272,481 B2 * | 9/2007 | Einig et al. | 701/70 |
| 7,277,786 B2 | 10/2007 | Stumpp et al. | |
| 7,301,479 B2 | 11/2007 | Regan | |
| 7,302,332 B2 | 11/2007 | Nenninger | |
| 7,394,354 B2 | 7/2008 | Yu | |
| 7,401,871 B2 | 7/2008 | Lu et al. | |
| 7,561,953 B2 * | 7/2009 | Yu | 701/78 |
| 7,917,274 B2 * | 3/2011 | Hackney et al. | 701/82 |
| 8,060,288 B2 * | 11/2011 | Choby | 701/70 |
| 2004/0021291 A1 | 2/2004 | Haug et al. | |
| 2004/0246116 A1 | 12/2004 | Polzin | |
| 2004/0249547 A1 * | 12/2004 | Nenninger | 701/70 |
| 2005/0006946 A1 | 1/2005 | Traechtler | |
| 2005/0065694 A1 | 3/2005 | Nenninger | |
| 2005/0206224 A1 | 9/2005 | Lu | |
| 2006/0025896 A1 | 2/2006 | Traechtler et al. | |
| 2006/0033308 A1 * | 2/2006 | Waldbauer et al. | 280/455.1 |
| 2006/0125313 A1 * | 6/2006 | Gunne et al. | 303/7 |
| 2006/0155457 A1 * | 7/2006 | Waldbauer et al. | 701/72 |
| 2006/0204347 A1 * | 9/2006 | Waldbauer et al. | 410/156 |
| 2006/0229782 A1 * | 10/2006 | Deng et al. | 701/42 |
| 2006/0273657 A1 | 12/2006 | Wanke et al. | |
| 2007/0260385 A1 * | 11/2007 | Tandy et al. | 701/70 |
| 2008/0036296 A1 * | 2/2008 | Wu et al. | 303/146 |
| 2008/0172163 A1 * | 7/2008 | Englert et al. | 701/83 |
| 2008/0177454 A1 | 7/2008 | Bond et al. | |
| 2008/0262686 A1 | 10/2008 | Kieren et al. | |
| 2009/0005932 A1 | 1/2009 | Lee et al. | |
| 2009/0005946 A1 * | 1/2009 | Futamura et al. | 701/70 |
| 2009/0093928 A1 | 4/2009 | Getman et al. | |
| 2009/0105906 A1 * | 4/2009 | Hackney et al. | 701/38 |
| 2009/0198425 A1 * | 8/2009 | Englert | 701/70 |
| 2009/0210112 A1 * | 8/2009 | Waldbauer et al. | 701/42 |
| 2009/0228182 A1 * | 9/2009 | Waldbauer et al. | 701/70 |
| 2009/0306861 A1 * | 12/2009 | Schumann et al. | 701/48 |

FOREIGN PATENT DOCUMENTS

| | | |
|---|---|---|
| DE | 19964048 | 1/2001 |
| DE | 10212582 | 9/2003 |
| EP | 1477338 | 11/2004 |
| EP | 1516792 | 3/2005 |
| GB | 2402453 | 12/2004 |
| JP | 2001191964 | 7/2001 |
| JP | 2002243423 | 8/2002 |
| JP | 2005132360 | 5/2005 |
| WO | 2006/000578 | 1/2006 |
| WO | 2008/021942 | 2/2008 |

OTHER PUBLICATIONS

"Automobiles", 81 pages, Copyright 2004 by Marcel Dekker, Inc.

Tamura, Kazuya, et al., "Autonomous Vehicle Control System of ICVS City Pal: Electrical Tow-bar Function", Proceedings of the IEEE Intelligent Vehicles Symposium 2000, pp. 702-707, Dearborn (MI), USA, Oct. 3-5, 2000.

Kimbrough, Scott, "Coordinated Braking and Steering Control for Emergency Stops and Accelerations", American Society of Mechanical Engineers, Design Engineering Division (Publication) DE, vol. 40, Advanced Automotive Technologies, pp. 229-244, ASME 1991.

Liebemann, E., et al., "Light Commercial Vehicles—Challenges for Vehicle Stability Control", Robert Bosch GmbH, Chassis Systems Control, Germany, Paper No. 07-0269.

Deng, Weiwen, et al., "Parametric Study on Vehicle-Trailer Dynamics for Stability Control", SAE International, SAE Technical Paper Series, 2003-01-1321, 2003 SAE World Congress, Detroit, Michigan, Mar. 3-6, 2003.

Kimbrough, Scott, et al., "A Brake Control Algorithm for Emergency Stops (Which May Involve Steering) of Tow-Vehicle/Trailer Combinations", Proceedings of the American Control Conference, vol. 1, pp. 409-414, 1991.

Chen, Chieh, et al., "Steering and Independent Braking Control for Tractor-Semitrailer Vehicles in Automated Highway Systems", Proceedings of the 34th Conference on Decision and Control, New Orleans, LA, vol. 2, pp. 1561-1566, Dec. 13-15, 1995.

Tseng, et al., "The Development of Vehicle Stability Control at Ford", IEEE/ASME Transactions on Mechatronics, vol. 4, No. 3., pp. 223-234, Sep. 1999.

Wu, Kevin, "Enhancement of Trailer Sway Mitigation by Using Trailer Brakes", Trailer Sway Mitigation, Vehicle Dynamics Expo USA, 2008 Conference, Bosch TSM, Oct. 23, 2008.

Wang, Guo-Lin, et al., "Breaking Stability Analysis of Car-Trailer", Journal of Jiangsu University, Natural Science Edition, vol. 27, No. 2. pp. 130-132, Mar. 2006.

PCT/US2007/075561 International Search Report and Written Opinion, 15 pages, dated Dec. 7, 2007.

U.S. Appl. No. 12/508,878, filed Jul. 24, 2009, Wu et al.

* cited by examiner

HOLISTIC CONTROL FOR STABILIZING VEHICLE-TRAILER SWAYING

BACKGROUND

Towing a trailer behind a vehicle often presents stability problems for both the vehicle and the trailer. Trailers tend to oscillate or sway back and forth in a lateral direction when being pulled behind a vehicle. The oscillations can occur due to wind, especially at high driving speeds. In addition, oscillations can occur as a result of other events. For example, an operator of the vehicle may swerve to avoid hitting an obstacle on the roadway. The quick swerving movement is transferred to the trailer and the trailer may begin to oscillate. Without proper damping, the oscillations may continue to increase in magnitude. If the oscillations are not decreased, the vehicle and trailer may become unstable.

SUMMARY

The invention relates to dampening trailer oscillations by selective braking of the trailer brakes. Specifically, an electronic stability control system detects oscillation of a trailer and applies asymmetric and symmetric braking torques to brakes on the trailer to reduce the oscillation.

Some methods have been developed to dampen and substantially decrease the frequency and magnitude of trailer oscillations in order to bring the vehicle and trailer back to a stable operating condition by applying braking force at the wheels of the vehicle. For example, trailer sway mitigation ("TSM") in vehicles is described in U.S. patent application Ser. No. 11/503,875, filed on Aug. 11, 2006 (which is incorporated herein by reference). Embodiments of the invention operate to dampen trailer oscillations by applying braking force at the wheels of the trailer.

In one embodiment, the invention provides a trailer sway intervention system. The trailer sway intervention system includes a trailer having a plurality of wheels, each wheel having a brake, and a vehicle towing the trailer. The vehicle includes a plurality of sensors configured to sense operating characteristics of the vehicle, and a controller. The controller receives the sensed operating characteristics from the sensors, determines an error based on a difference between an expected yaw rate and a sensed yaw rate, asymmetrically applies braking forces to one or more trailer wheels based on the difference, and symmetrically applies braking forces to the trailer wheels when the absolute value of the difference between the expected yaw rate and the sensed yaw rate is declining.

In another embodiment the invention provides a method of reducing trailer oscillation. The method includes the acts of calculating a target yaw rate for a vehicle, sensing an actual yaw rate for the vehicle, determining an error value based on a difference between the target yaw rate and sensed yaw rate, asymmetrically applying braking forces to one or more wheels of the trailer based on the error, and symmetrically applying braking forces to a plurality of the one or more wheels of the trailer when the absolute value of a magnitude of the error is declining.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

As should also be apparent to one of ordinary skill in the art, the systems shown in the figures are models of what actual systems might be like. Many of the modules and logical structures described are capable of being implemented in software executed by a microprocessor or a similar device or of being implemented in hardware using a variety of components including, for example, application specific integrated circuits ("ASICs"). Terms like "processor" may include or refer to both hardware and/or software. Furthermore, throughout the specification capitalized terms are used. Such terms are used to conform to common practices and to help correlate the description with the coding examples, equations, and/or drawings. However, no specific meaning is implied or should be inferred solely due to the use of capitalization.

Figure 1:
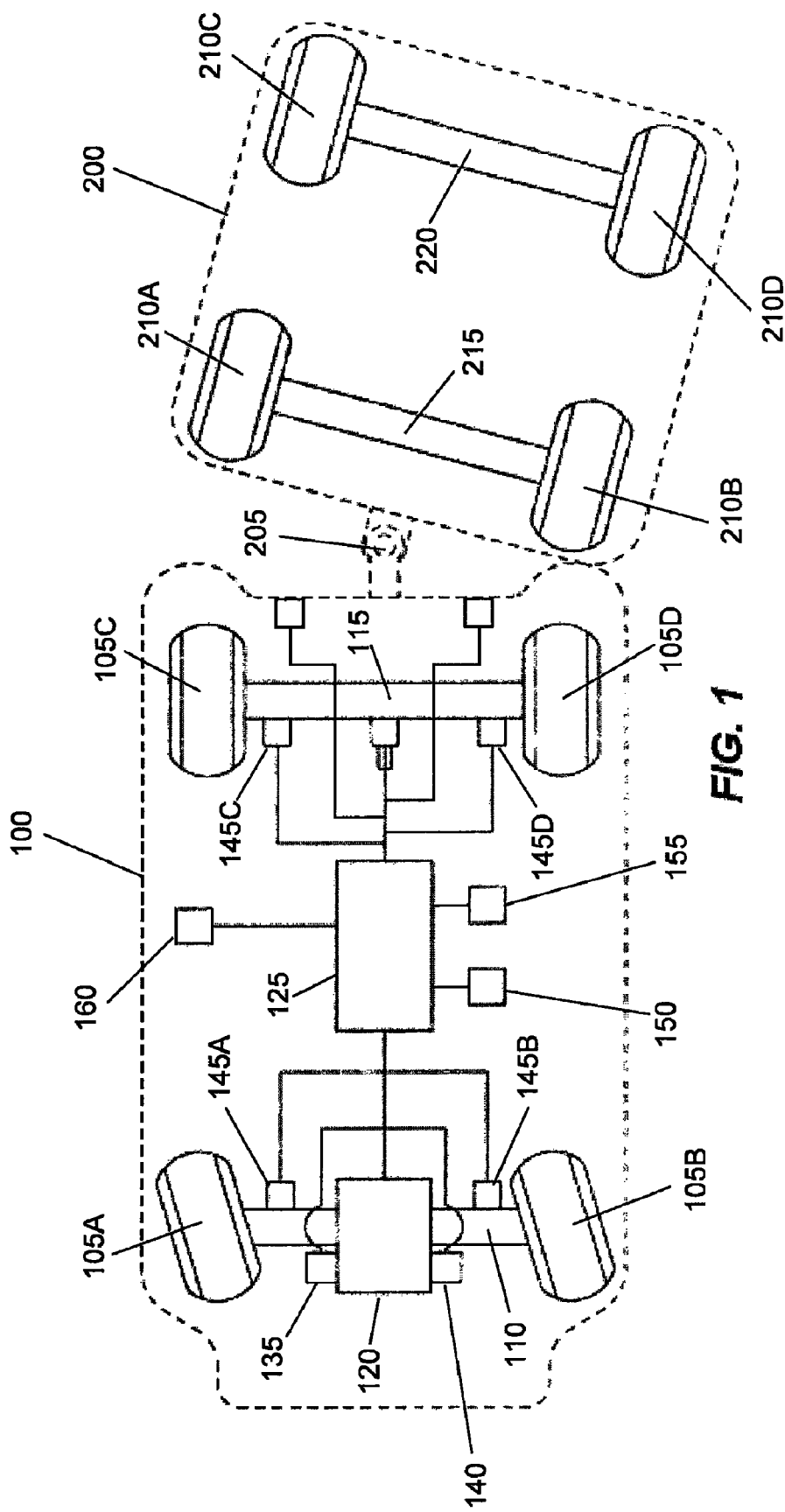
FIG. 1 is a schematic view of a vehicle and trailer.

FIG. 1 illustrates a vehicle 100 that has four wheels 105A, 105B, 105C, and 105D. The front wheels 105A and 105B are coupled to a front axle 110, and the rear wheels 105C and 105D are coupled to a rear axle 115. The vehicle 100 includes an engine 120 and an electronic control unit ("ECU") 125. An operator (i.e., a driver) of the vehicle 100 operates a throttle and brake, and turns a steering wheel to direct the vehicle in a desired direction.

The vehicle 100 also includes a plurality of sensors that provide information to the ECU 125. The sensors include a steering angle sensor 135, an engine torque sensor 140, a plurality of wheel speed sensors 145A, 145B, 145C, and 145D corresponding to each wheel, a brake-system master cylinder pressure sensor 150, a lateral acceleration sensor 155, and a yaw rate sensor 160. Of course, in other embodiments, the vehicle 100 could include more or less sensors. Sensed conditions are transduced and converted into calibrated signals that are indicative of the operation of the vehicle 100. For example, if the wheel speed sensors 145A, 145B, 145C, and 145D are equipped with calibration circuitry or a processor, the sensors can internally convert the speed to a calibrated form. Otherwise, the sensed conditions can be converted into calibrated signals by other external processes in a manner known in the art (e.g., the ECU 125). Sensors, in addition to or in place of those described, may be used to sense other events, such as side-to-side movements or acceleration of the vehicle 100. Collectively, values of the signals outputted by sensors are referred to as sensed values, or values.

A trailer 200 is coupled to the rear end of the vehicle by a hitch 205. The trailer 200 includes four wheels 210A, 210B, 210C, and 210D. The front wheels 210A and 210B are coupled to a front axle 215, and the rear wheels 210C and 210D are coupled to a rear axle 220. The trailer 200 can have different numbers of axles (e.g., one) (and, therefore, a different number of wheels), and can be a semi-trailer, a full-size trailer, a boat trailer, a camper, or the like. The trailer 200 also includes brakes at each of the wheels 210A-210D. The brakes can be electric or hydraulic and are controlled by the ECU 125 via electric signals (e.g., to the brake valves individually or to electric motors or actuators).

The ECU 125 determines a set of vehicle targets for the vehicle 100. Particularly, when the driver attempts to move the vehicle 100 in a certain direction, or at a certain speed, the driver inputs are sensed and signals indicative of the driver inputs are sent to the ECU 125. As a result, the ECU 125 determines a set of vehicle targets indicative of the driver inputs (e.g., steering, throttle, etc.). For example, when the driver attempts to steer the vehicle 100 in a certain direction with a steering wheel, the ECU 125 generates a set of vehicle targets that correspond to the steering angle generated by the driver. In some embodiments, the set of vehicle targets includes a set of yaw rates. As a result, the set of vehicle conditions includes a set of yaw rates actually exhibited by the vehicle 100, and a set of expected yaw rates based on the steering input of the driver.

The vehicle 100 includes an electronic stability control ("ESC") application or module. The ESC application is a software program that is executed by the ECU 125 and includes one or more electronic stability control functions. The ECU 125 receives signals corresponding to vehicle characteristics from the vehicle sensors (e.g., the engine torque sensor 140, wheel speed sensors 145A-145D, master cylinder pressure sensor 150, lateral acceleration sensor 155, and yaw rate sensor 160), and the ESC application uses these signals to detect instability of the vehicle 100 and help correct the situation. For example, when the controller 125 detects a loss of steering control, the controller 125 automatically applies one or more of the vehicle's brakes to help steer the vehicle 100 in a desired direction. That is, the ESC application increases the stability of the vehicle 100 by causing the brakes (or, more broadly, wheel torque) to be controlled in a specified manner. This braking (or, more broadly, torque control) can be symmetric and symmetric braking. The ESC can also detect and dampen trailer oscillations. In some embodiments, the controller 125 also reduces engine power when it detects a skid or slide of the vehicle 100, until the driver regains control of the vehicle 100.

Symmetric braking forces are braking forces that are applied equally to the all the wheels (or the two front wheels or the two rear wheels). Asymmetric braking forces are braking forces that are applied unequally to one or more of the wheels. For example, an asymmetric braking force may be applied only to the front right wheel. Then, a similar asymmetric braking force may be applied only to the front left wheel. Or the asymmetric braking can be applied in varying proportions to a plurality of wheels.

If the trailer 200 begins to oscillate, the driver may respond to the oscillation by steering or pressing a brake pedal in an attempt to compensate for the movement. As a result, the driver may over-steer and may lose control of the vehicle. In addition to vehicle stability functions, the ESC application includes a trailer sway intervention ("TSI") function. The TSI assists the driver in reducing trailer oscillations. When the ESC detects that the trailer 200 is oscillating, the ESC provides various asymmetric and symmetric braking forces until the trailer oscillations are reduced to an acceptable level.

In general terms, the TSI increases the stability of the vehicle 100 and trailer 200 by causing the brakes (or, more broadly, wheel torque) of the trailer 200 to be controlled in a specified manner. Asymmetric and symmetric braking (or, more broadly, torque control) is applied to the trailer wheels 210A-210D to dampen trailer oscillations. Symmetric braking forces are applied equally to the trailer wheels, while asymmetric braking forces are applied unequally to one or more of the wheels. For example, a braking force may be applied to only the right wheel. Then, a similar braking force may be applied to only the left wheel. Various asymmetric braking may be carried out until trailer oscillations decrease to an acceptable level.

Figure 2:
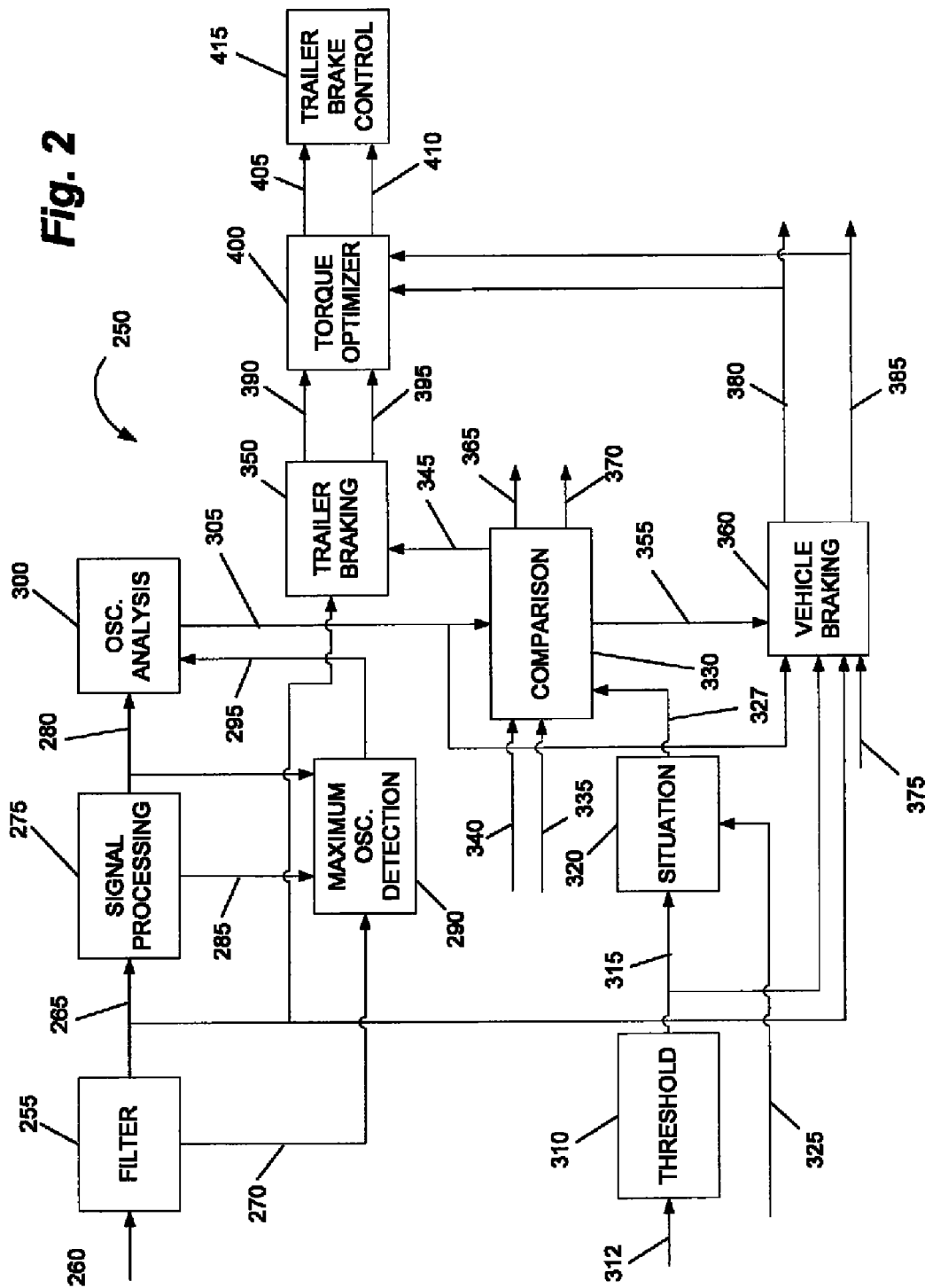
FIG. 2 is a block diagram of an electronic stability control system.

FIG. 2 illustrates the functions of an ESC application 250. A filter 255 receives a yaw rate signal 260 (e.g., from the yaw rate sensor 160), and performs various filtering operations on the yaw rate signal 260, producing a band-pass filtered signal 265 and a low-pass filtered signal 270. The band-pass filtered signal 265 is provided to a signal processing module 275 which generates a yaw rate oscillation signal 280 and a control signal 285. An oscillation maximum detection module 290 receives the low-pass signal 270 from the filter 255 and the yaw rate oscillation signal 280 and the control signal 285 from the signal processing module 275. The oscillation maximum detection module 290 detects the maximum oscillation of the yaw rate for each yaw rate cycle. The oscillation maximum detection module 290 provides a signal 295 indicative of the maximum yaw rate for the present yaw rate cycle to an oscillation analysis module 300. The oscillation analysis module 300 also receives the yaw rate oscillation signal 280 from the signal processing module 275. The oscillation analysis module 300 provides a control signal 305 indicating whether the oscillation of the yaw rate exceeds a pre-determined threshold.

The ESC 250 also includes a yaw rate threshold module 310 which receives a signal 312 indicative of the speed of the vehicle 100. The yaw rate threshold module 310 determines a maximum allowable yaw rate based on the speed of the vehicle 100 and generates a yaw rate threshold signal 315. A situation module 320 receives the yaw rate threshold signal 315 and a driver steering input signal 325 (e.g., from the steering angle sensor 135) and generates a threshold comparison signal 327 (e.g., indicating whether the driver is trying to oversteer in a particular situation).

A comparison module 330 receives the control signal 305 from the oscillation analysis module 300, the threshold comparison signal 327 from the situation module 320, a pedal travel signal 335 indicative of the driver's operation of a brake pedal, and a trailer connected signal 340 indicating whether the vehicle is electrically and mechanically connected to a trailer. In some embodiments, there is no trailer connected signal.

Based on the signals received, the comparison module 330 provides a control signal 345 to a trailer brake module 350 and a control signal 355 to a vehicle brake module 360. The control signals 345 and 355 indicate whether, and to what extent, the brake modules 350 and 360 should perform their stability control functions. The comparison module 330 also provides a trailer sway mitigation signal 365 (e.g., indicating whether the TSI function is operative), and a engine torque reduction signal 370 (e.g., to cause the ECU 125 to reduce the engine 120 torque output, and assist in slowing the vehicle).

In addition to the control signal 355, the vehicle brake module 360 receives the control signal 305 from the oscillation analysis module 300, the band-pass filtered yaw rate signal 265, the yaw rate threshold signal 315, and a signal 375 indicative of the desired engine torque based on the driver's operation of the throttle. Based on these inputs, the vehicle brake module 360 generates a symmetric vehicle braking signal 380 and an asymmetric vehicle braking signal 385 which control the braking torque applied to the vehicle's brakes as described above.

The trailer brake module 350 receives the control signal 345 from the comparison module 330 and the band-pass filtered yaw rate signal 265. Based on these inputs, the trailer brake module 350 generates a symmetric trailer braking signal 390 and an asymmetric trailer braking signal 395. The symmetric trailer braking signal 390, asymmetric trailer braking signal 395, symmetric vehicle braking signal 380, and asymmetric vehicle braking signal 385 are all provided to a torque optimizer module 400 which optimizes the trailer braking signals and provides the optimized symmetric and asymmetric trailer braking signals 405 and 410 to a trailer controller 415. The trailer controller 415 controls the brakes of the trailer based on the signals 405 and 410.

Figure 3:
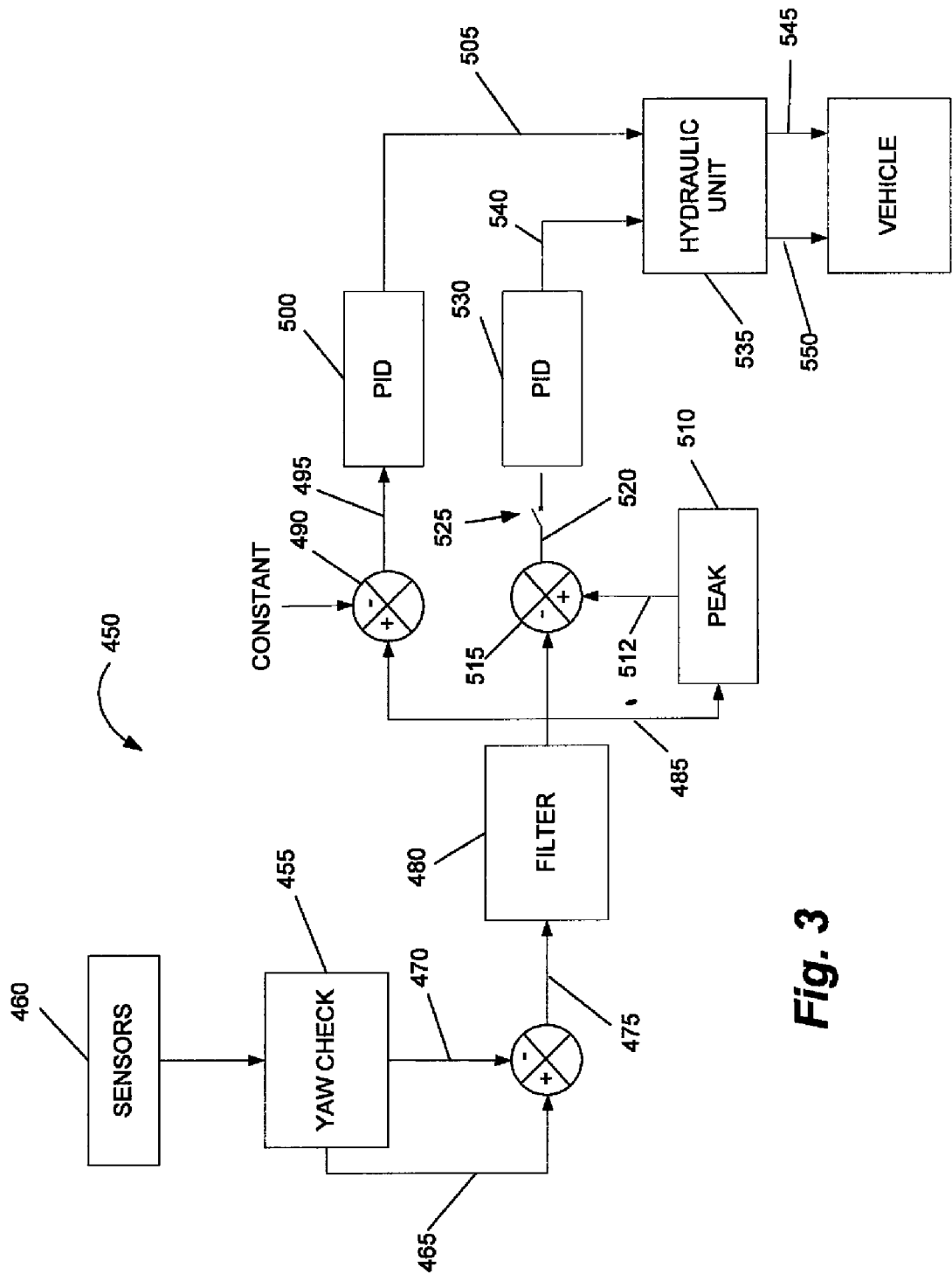
FIG. 3 is a block diagram of a trailer sway intervention component of the electronic stability control system of FIG. 2.

FIG. 3 illustrates the functions of a trailer sway intervention function 450. A yaw check module 455 receives information from a plurality of vehicle sensors 460. Based on data from the sensors 460, the yaw check module 455 generates a target yaw rate 465 and a measured yaw rate 470. The target yaw rate 465 is compared to the measured yaw rate 470, and a difference or error signal 475 is generated. The error signal 475 represents the difference between the yaw rate intended by a driver of the vehicle 100 and the actual yaw rate detected. The error signal 475 is provided to a band-pass filter 480 which generates a filtered error signal 485.

The filtered error signal 485 is provided to a first summer 490 which adds a constant to the filtered error signal 485. In some embodiments the constant is zero. The output of the first summer 490 is an asymmetric control signal 495. The asymmetric control signal 495 is provided to a first closed loop controller 500 (i.e., a PID controller). The first closed loop controller 500 determines an amount of braking torque to be applied to the brakes of the trailer 200 and the distribution of the torque between the brakes, and outputs an asymmetric signal 505 indicative of this torque and distribution.

The filtered error signal 485 is also provided to peak identification module 510. The peak identification module 510 determines the peak of the filtered error signal 485 for each cycle of the yaw oscillation, outputting a peak signal 512. A second summer 515 determines the difference between the peak signal 512 and the present filtered error signal 485, outputting a difference signal 520. The difference signal 520 is provided to a switch 525. The switch 525 is closed when the filtered error signal 485 is moving from a peak (positive or negative) to zero (i.e., when d(|filtered error 485|)/dt is less than zero), and is open the remainder of the time. When the switch 525 is closed, the difference signal 520 is provided to a second closed loop controller 530 (e.g., a PID controller). The second closed loop controller 530 determines what quantity of braking torque is to be applied to the trailer brakes symmetrically. A hydraulic unit 535 receives the asymmetric signal 505 and a symmetric signal 540 (from the second closed loop controller 530) and generates braking torque signals 545 and 550 for the left and right trailer brakes respectively (i.e., for a trailer 200 having two wheels).

Figure 4:
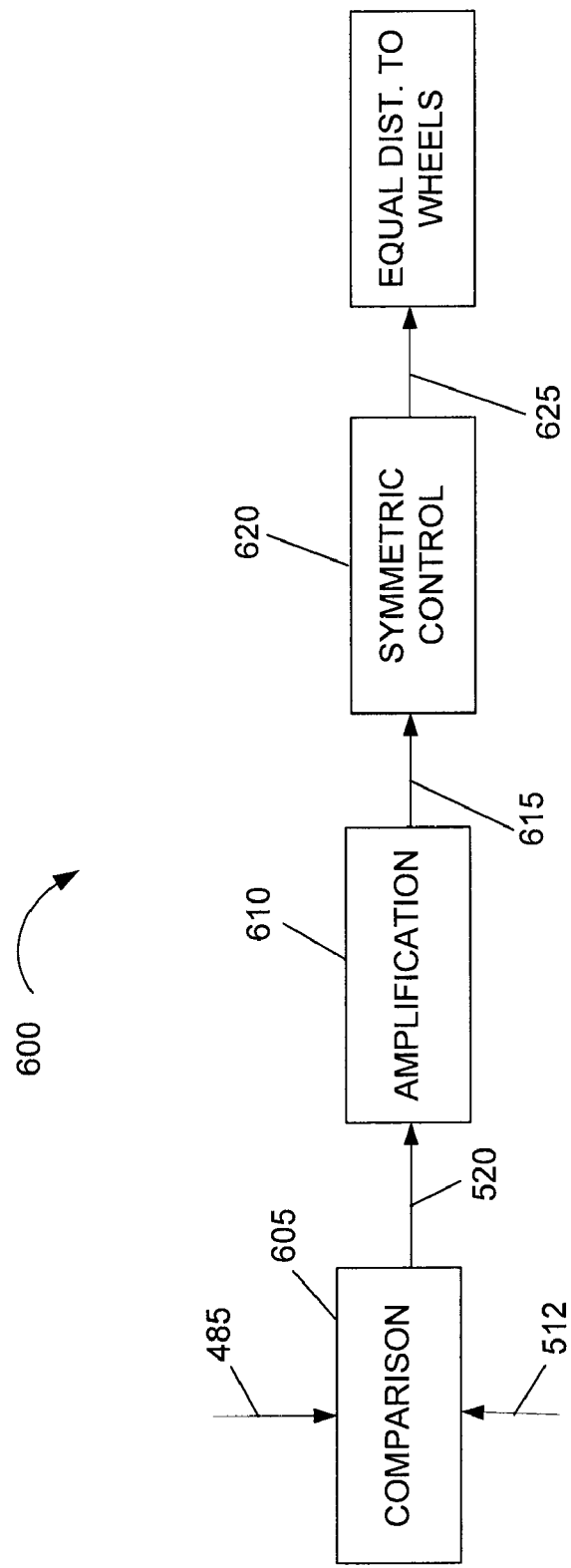
FIG. 4 is a block diagram of a symmetric braking control function.
Figure 5:
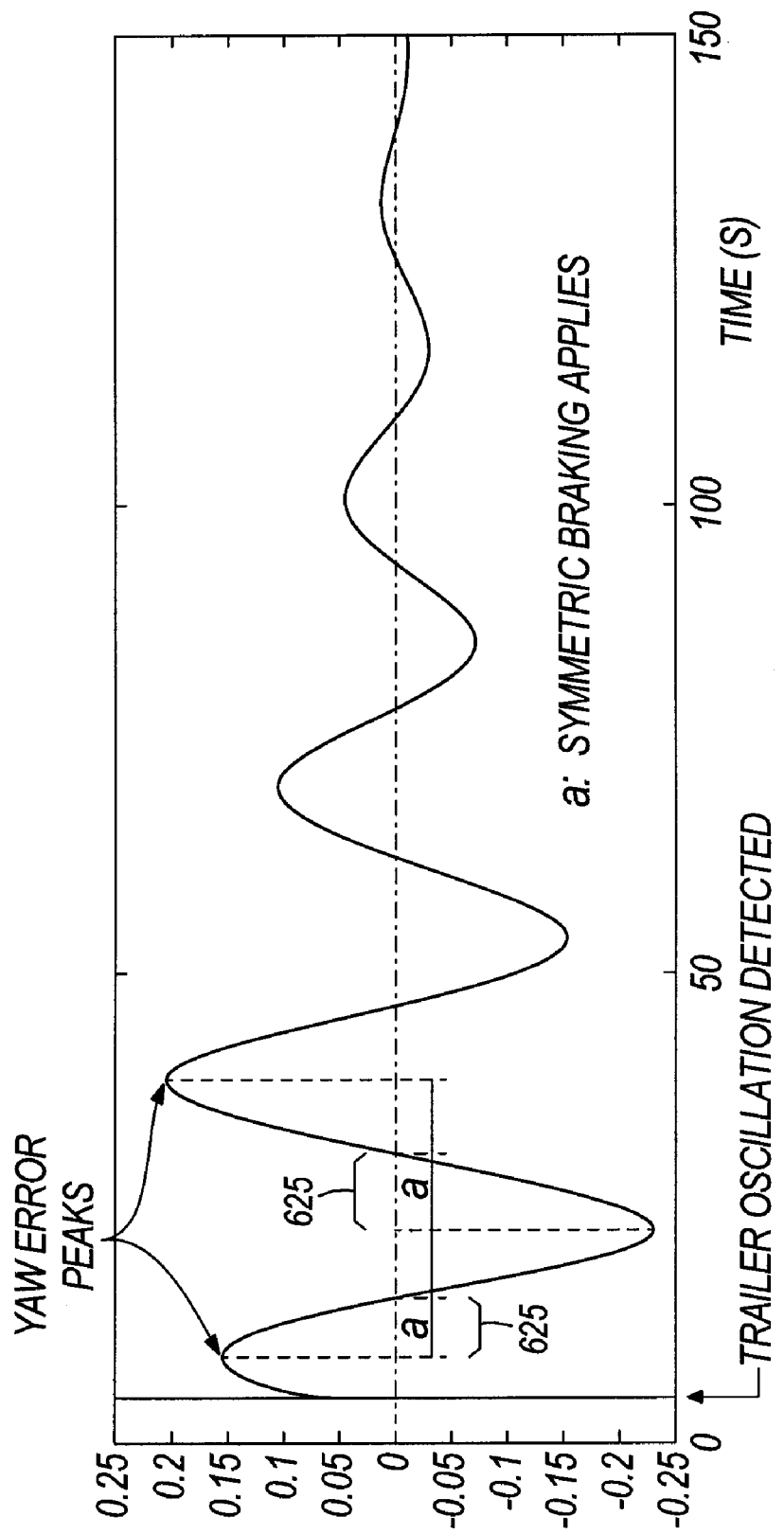
FIG. 5 is a simulation graph of trailer oscillation employing a symmetric trailer sway intervention function.

FIG. 4 illustrates the functions of a symmetric braking function 600. A comparison module 605 compares the filtered yaw rate error signal 485 against the peak filtered yaw rate error signal 512. The difference 520 is provided to an amplifier 610 resulting in an symmetric signal 615 which is provided to a symmetric controller 620. The symmetric controller 620 provides a symmetric (equal) braking torque 625 to the brakes. As shown in FIG. 5, the symmetric braking torque 625 is applied to trailer brakes during the time the yaw rate error is moving from a positive or negative peak to zero (when the switch 525 is closed).

Figure 6:
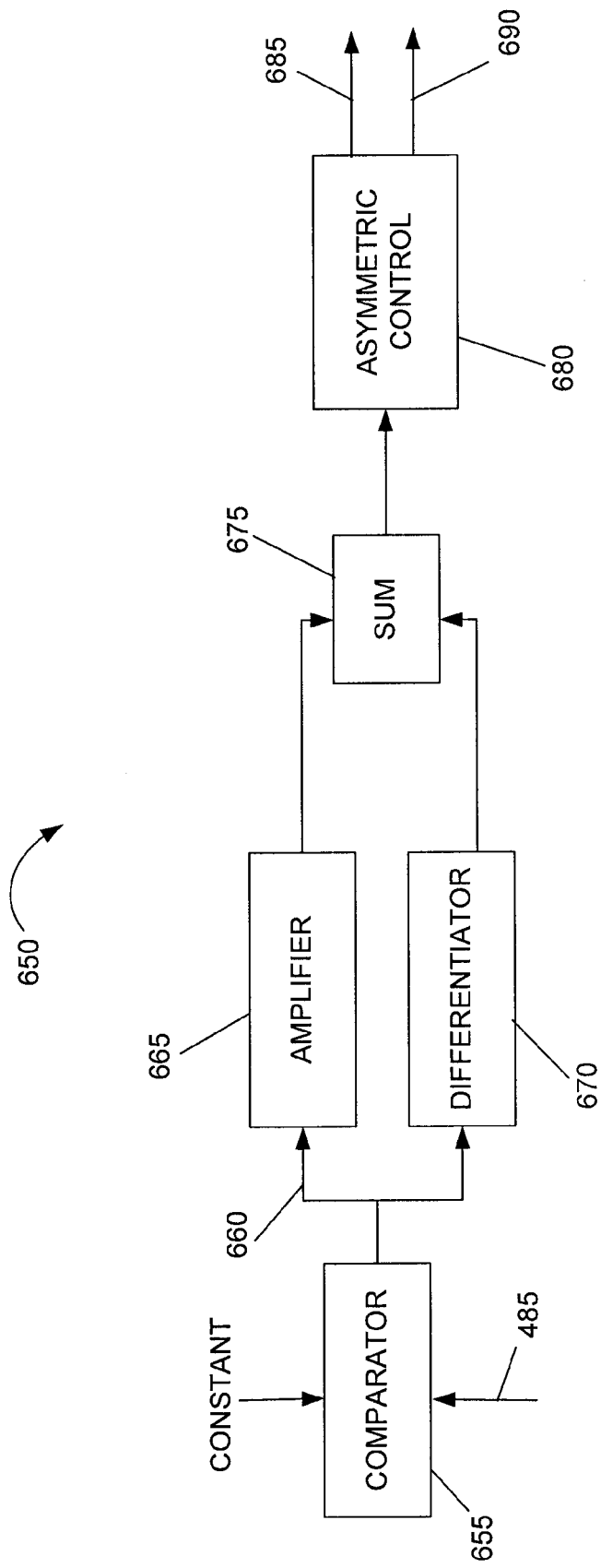
FIG. 6 is a block diagram of an asymmetric braking control function.
Figure 7:
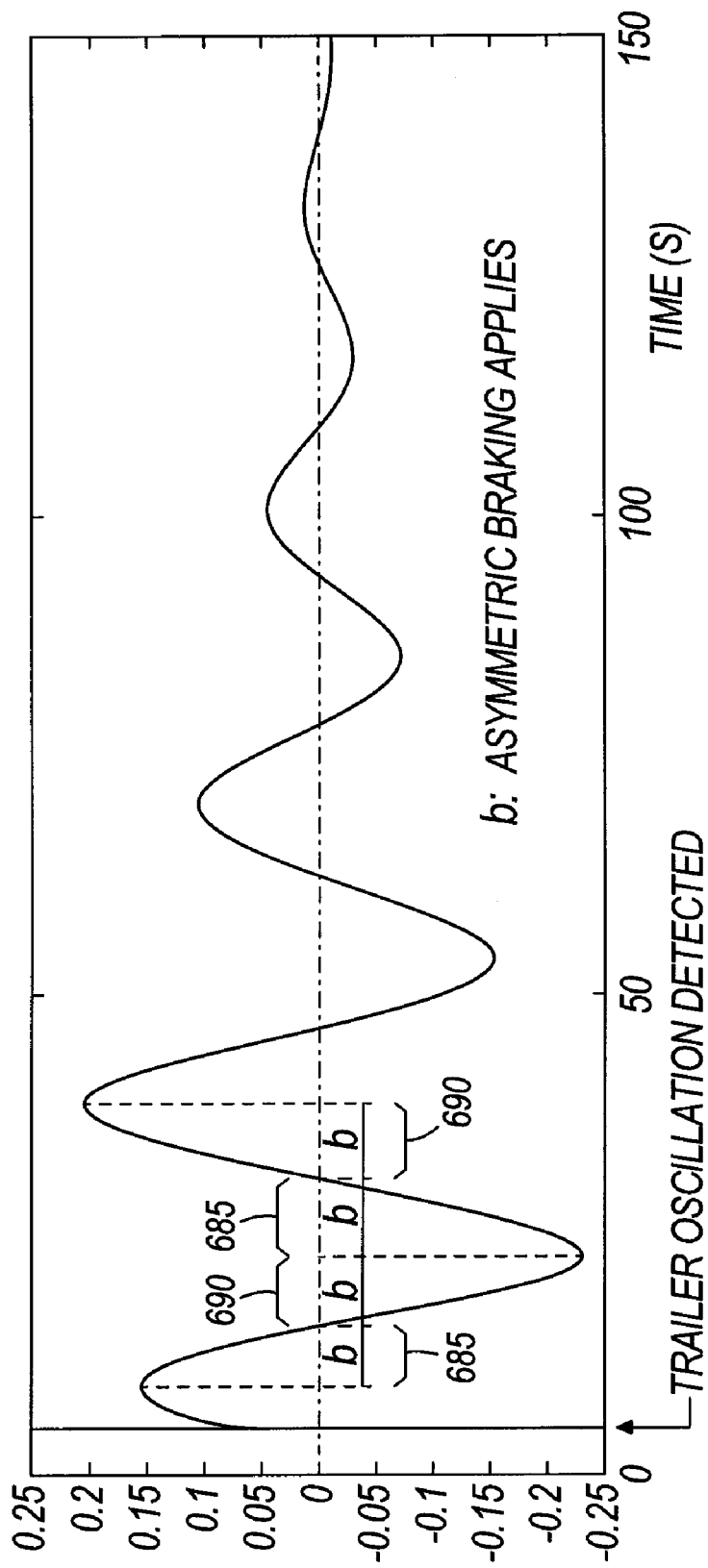
FIG. 7 is a simulation graph of trailer oscillation employing an asymmetric trailer sway intervention function.

FIG. 6 illustrates the functions of a asymmetric braking function 650. A comparison module 655 compares the filtered yaw rate error signal 485 against a constant (e.g., zero). The difference 660 is provided to an amplifier 665 and a differentiator 670. The resulting signals are summed in a summer 675 and provided to a controller 680 which generates (for a single axle trailer) a right trailer brake torque 685 and a left trailer brake torque 690. As shown in FIG. 7, the asymmetric braking torque 685/690 is applied (at varying levels) to trailer brakes during the entire time excess trailer oscillation is occurring.

Figure 8:
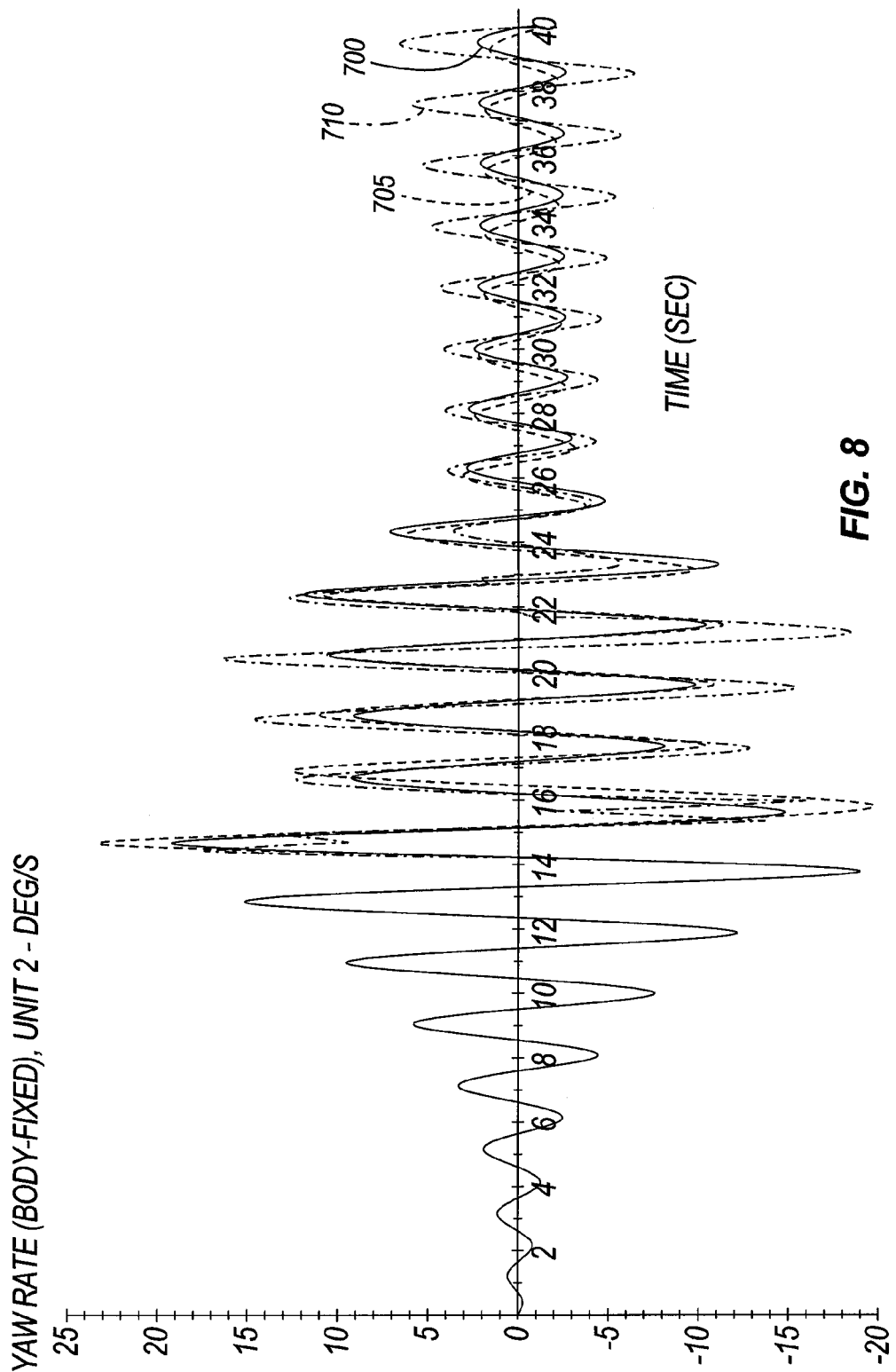
FIG. 8 is a simulation graph of trailer oscillation comparing the impact of a combined symmetric/asymmetric trailer sway intervention function, a symmetric trailer sway intervention function, and an asymmetric trailer sway intervention function.
Figure 9:
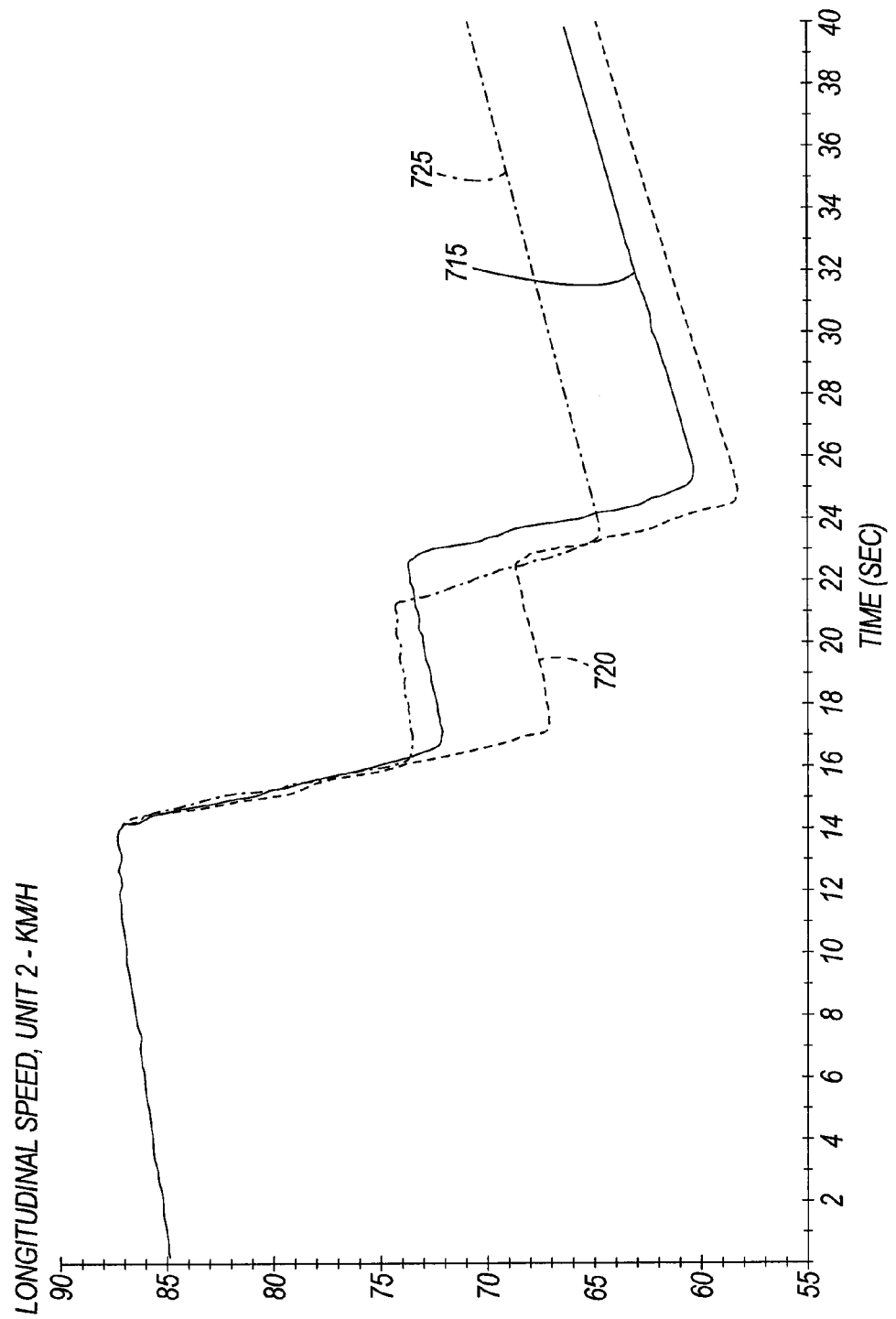
FIG. 9 is a simulation graph of trailer oscillation comparing the speed of the trailer using a combined symmetric/asymmetric trailer sway intervention function, a symmetric trailer sway intervention function, and an asymmetric trailer sway intervention function.

The symmetric trailer braking and the asymmetric trailer braking work together and compensate each other. When symmetric breaking is at its maximum, asymmetric braking is at its minimum, and vice versa (e.g., the symmetric and asymmetric have an inverse relationship). Thus, during periods when the yaw rate error is moving from zero to a peak, asymmetric braking is at its maximum and symmetric braking is at zero. When the error is moving from a peak to zero, symmetric braking and asymmetric braking have varying proportions. FIG. 8 shows the results of simulation testing of the combination of symmetric/asymmetric trailer braking 700 versus symmetric trailer braking alone 705 and asymmetric trailer braking alone 710. And FIG. 9 shows the resulting simulated speed of the trailer using the three braking methods, the combination of symmetric/asymmetric trailer braking 715, symmetric trailer braking alone 720, and asymmetric trailer braking alone 725.

Various features and advantages of the invention are set forth in the following claims.

What is claimed is:

1. A trailer sway intervention system, comprising:
a trailer including a plurality of wheels, each wheel having a brake; and
a vehicle towing the trailer, the vehicle including a plurality of sensors configured to sense operating characteristics of the vehicle, a controller configured to receive the sensed operating characteristics from the plurality of sensors, determine an error, the error being a difference between an expected yaw rate and a sensed yaw rate, asymmetrically apply braking forces to one or more trailer wheels based on the difference between the expected yaw rate and the sensed yaw rate, and symmetrically apply braking forces to the trailer wheels when the absolute value of the difference between the expected yaw rate and the sensed yaw rate is declining;
wherein the asymmetric braking forces have an inverse relationship to the symmetric braking forces.

2. The trailer sway intervention system of claim 1, wherein a magnitude of the asymmetric braking forces are determined by a first closed loop controller using the error.

3. The trailer sway intervention system of claim 2, wherein the first closed loop controller is a PID controller.

4. The trailer sway intervention system of claim 2, wherein a magnitude of the symmetric braking forces are determined by a second closed loop controller using a difference between the error and a peak magnitude of the difference between the expected yaw rate and the sensed yaw rate.

5. The trailer sway intervention system of claim 4, wherein the second closed loop controller is a PID controller.

6. The trailer sway intervention system of claim 1, wherein the trailer sway intervention system is part of a vehicle electronic stability control system.

7. The trailer sway intervention system of claim 6, wherein an operation of the vehicle electronic stability control system on the vehicle is modified when the trailer is present.

8. A method of reducing trailer oscillation, comprising:
    calculating a target yaw rate for a vehicle;
    sensing an actual yaw rate for the vehicle;
    determining an error value based on a difference between the target yaw rate and sensed yaw rate;
    asymmetrically applying braking forces to one or more wheels of a trailer based on the error; and
    symmetrically applying braking forces to a plurality of the one or more wheels of the trailer when the absolute value of a magnitude of the error is declining;
    wherein the braking forces applied asymmetrically have an inverse relationship to the braking forces applied symmetrically.

9. The method of claim 8, further comprising performing proportional integral derivative closed loop control on the error to determine the asymmetric braking force.

10. The method of claim 8, further comprising determining a peak magnitude of the error for each cycle of the error.

11. The method of claim 10, further comprising determining a difference between the peak magnitude of the error and the determined error.

12. The method of claim 11, further comprising performing proportional integral derivative closed loop control on the difference between the peak magnitude of the error and the determined error to determine the symmetric braking force.

13. The method of claim 8, wherein one or more vehicle electronic stability control functions is altered when the vehicle is towing a trailer.

* * * * *